(12) United States Patent
Barber

(10) Patent No.: US 7,614,518 B2
(45) Date of Patent: Nov. 10, 2009

(54) HOLDER FOR BAKED GOODS

(75) Inventor: Thomas Barber, Redondo Beach, CA (US)

(73) Assignee: Bradshaw International, Inc., Rancho Cucamonga, CA (US)

( * ) Notice: Subject to any disclaimer, the term of this patent is extended or adjusted under 35 U.S.C. 154(b) by 609 days.

(21) Appl. No.: 11/372,273

(22) Filed: Mar. 10, 2006

(65) Prior Publication Data

US 2006/0225581 A1 Oct. 12, 2006

Related U.S. Application Data

(60) Provisional application No. 60/669,752, filed on Apr. 8, 2005.

(51) Int. Cl.
 B65D 45/20 (2006.01)
 B65D 21/02 (2006.01)
 A47J 27/00 (2006.01)

(52) U.S. Cl. .................. 220/23.89; 220/324; 220/573.1

(58) Field of Classification Search ............. 220/573.1, 220/665, 663, 662, 323, 325, 915.1, 23.89, 220/23.88, 23.86; 206/504; D7/357; 99/426, 99/448

See application file for complete search history.

(56) References Cited

U.S. PATENT DOCUMENTS

| | | | | | |
|---|---|---|---|---|---|
| 1,396,148 | A | * | 11/1921 | Snyder | 206/503 |
| 1,762,417 | A | * | 6/1930 | Pfefferkorn | 312/284 |
| 1,863,793 | A | * | 6/1932 | Hermani | 312/284 |
| 2,138,560 | A | * | 11/1938 | Stuart | 220/23.83 |
| 2,507,425 | A | * | 5/1950 | Swartout | 220/592.28 |
| 3,130,288 | A | * | 4/1964 | Monaco et al. | 219/385 |
| 3,484,035 | A | * | 12/1969 | Swett et al. | 220/508 |
| 3,511,288 | A | * | 5/1970 | Swett et al. | 206/45.2 |
| 3,670,916 | A | * | 6/1972 | Alpert | 220/23.87 |
| 4,147,277 | A | * | 4/1979 | Bateman et al. | 220/574.2 |
| 4,197,940 | A | * | 4/1980 | DeRossett | 220/780 |
| 4,300,444 | A | * | 11/1981 | Muse | 99/448 |
| 4,472,440 | A | * | 9/1984 | Bank | 426/128 |
| 4,705,163 | A | * | 11/1987 | James | 426/128 |
| 4,860,894 | A | * | 8/1989 | Koenig | 206/421 |
| 4,880,951 | A | * | 11/1989 | Levinson | 219/733 |
| D347,355 | S | * | 5/1994 | Naft | D7/357 |
| D348,378 | S | * | 7/1994 | Crane | D7/610 |
| D356,716 | S | * | 3/1995 | Dornbush et al. | D7/357 |
| D374,820 | S | * | 10/1996 | Knoss et al. | D9/429 |
| D384,554 | S | * | 10/1997 | Ancona et al. | D7/505 |
| D396,999 | S | * | 8/1998 | Boothe | D7/610 |
| D400,055 | S | * | 10/1998 | McFadzean | D7/610 |
| 5,967,323 | A | * | 10/1999 | Siragusa | 206/499 |
| 6,321,925 | B1 | * | 11/2001 | Crouse et al. | 220/4.27 |
| D479,952 | S | * | 9/2003 | Zimmerman | D7/610 |
| 2003/0198581 | A1 | * | 10/2003 | Sweet et al. | 422/292 |

(Continued)

Primary Examiner—Anthony D Stashick
Assistant Examiner—Robert J Hicks
(74) Attorney, Agent, or Firm—Birch, Stewart, Kolasch & Birch, LLP

(57) ABSTRACT

A holder for cupcakes, muffins or other baked goods comprising at least two spaced pans and a transparent protective cover, the upper pan having wide legs at opposite ends with feet engaging the lower pan and clamped between handles on the cover and the lower pan to hold the upper pan in place. Pivoted latches secure the handles releasably together for toting of the holder by a top handle on the cover, and include arcuate, channel-shaped members that are flush with the end handles when latched.

18 Claims, 5 Drawing Sheets

U.S. PATENT DOCUMENTS

| | | | |
|---|---|---|---|
| 2004/0099149 A1* | 5/2004 | Morgan | 99/426 |
| 2004/0182257 A1* | 9/2004 | Morgan | 99/426 |
| 2005/0077195 A1* | 4/2005 | Nall | 206/216 |
| 2005/0098046 A1* | 5/2005 | Morgan | 99/426 |
| 2005/0236413 A1* | 10/2005 | Maciag et al. | 220/256.1 |
| 2005/0269229 A1* | 12/2005 | Lowry | 206/386 |
| 2006/0021889 A1* | 2/2006 | Kim | 206/320 |
| 2006/0266757 A1* | 11/2006 | Camacho et al. | 220/912 |

* cited by examiner

US 7,614,518 B2

HOLDER FOR BAKED GOODS

CROSS-REFERENCE TO THE RELATED APPLICATION

This Nonprovisional application claims priority under 35 U.S.C. § 119(e) on U.S. Provisional Application No. 60/669,752 filed on Apr. 8, 2005, the entire contents of which are hereby incorporated by reference.

BACKGROUND OF THE INVENTION

This invention relates to holders or pans for baked goods such as so-called cupcakes or muffins, and has particular reference to holders of the type having a plurality of recesses in which dough can be baked to produce a cupcake in each cavity. The invention also relates to covered holders or pans for prolonging the freshness of the baked goods.

A well known type of cupcake holder is a flat metal pan or tray, usually rectangular in shape, having a pattern of cup-shaped recesses that typically are circular in cross-sectional shape and taper downwardly from an open upper end. Such recesses advantageously are formed as cavities in a single sheet of heat-resistant metal that may have handles at its ends.

Baking pans sometimes are provided with tent-like covers for maintaining freshness of the baked goods prior to use, and also for shielding the goods from insects. These covers are shaped to rest on the rim of the pans and have sidewalls and a top wall for overlying the baked goods on the pan.

SUMMARY OF THE INVENTION

The present invention provides a multiple-tiered holder having a basically conventional base which is a baking pan with a plurality of recesses for baking a selected number of cupcakes or muffins and at least a second tier that holds a second selected number of cupcakes or muffins in an elevated layer over the base, supported by upright legs engaging the base or first tier. A cover for the baked goods rests on the base pan around the baking recesses therein and is sized and shaped to enclose the multiple tiers of baked goods, having end handles that overlie handles on the base pan and interfitting portions of the second tier structure to hold it securely in place when the cover is in place. Latches on the end handles of the cover secure the cover releasably in place, the preferred latches being hinged arcuate channels pivoted on the cover for swinging into and out of the latching engagement with the handles of the base pan and the second tier and fitting flush with the handles when latched.

The preferred cover is composed of shatter resistant transparent material and has a carrying handle mounted in a recess on its upper side for "toting" the holder while it is loaded with baked goods. The preferred second tier is a second sheet of heat-resistant material that is shaped to overlie the base pan just above the baked goods and has a selected number of cup-shaped recesses, which may be substantially the same as the base sheet. Legs on the ends of the second-tier sheet engage the rim of the base pan near the handles and have bottom flanges that are trapped between the cover and base handles when the latter are latched together.

Other aspects and advantages of this invention will become apparent from the following detailed description, taken in conjunction with the accompanying drawings.

DETAILED DESCRIPTION

Figure 1:
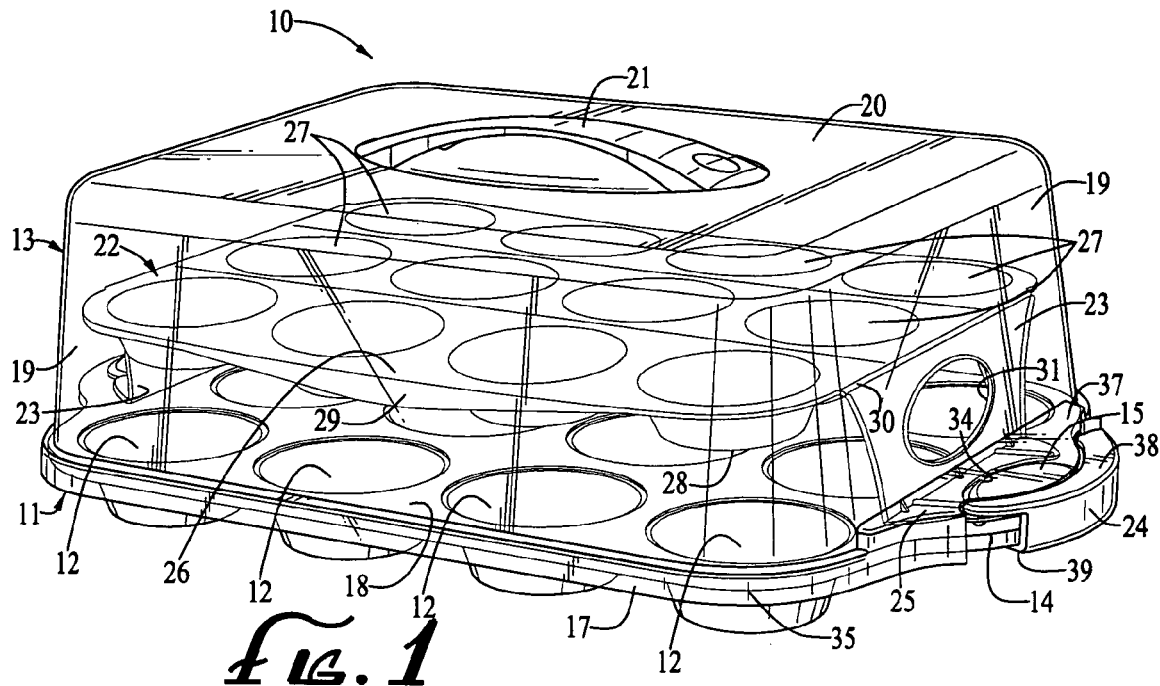
FIG. 1 is a side and top perspective view of a multiple-tiered holder embodying the novel features of the present invention.
Figure 2:
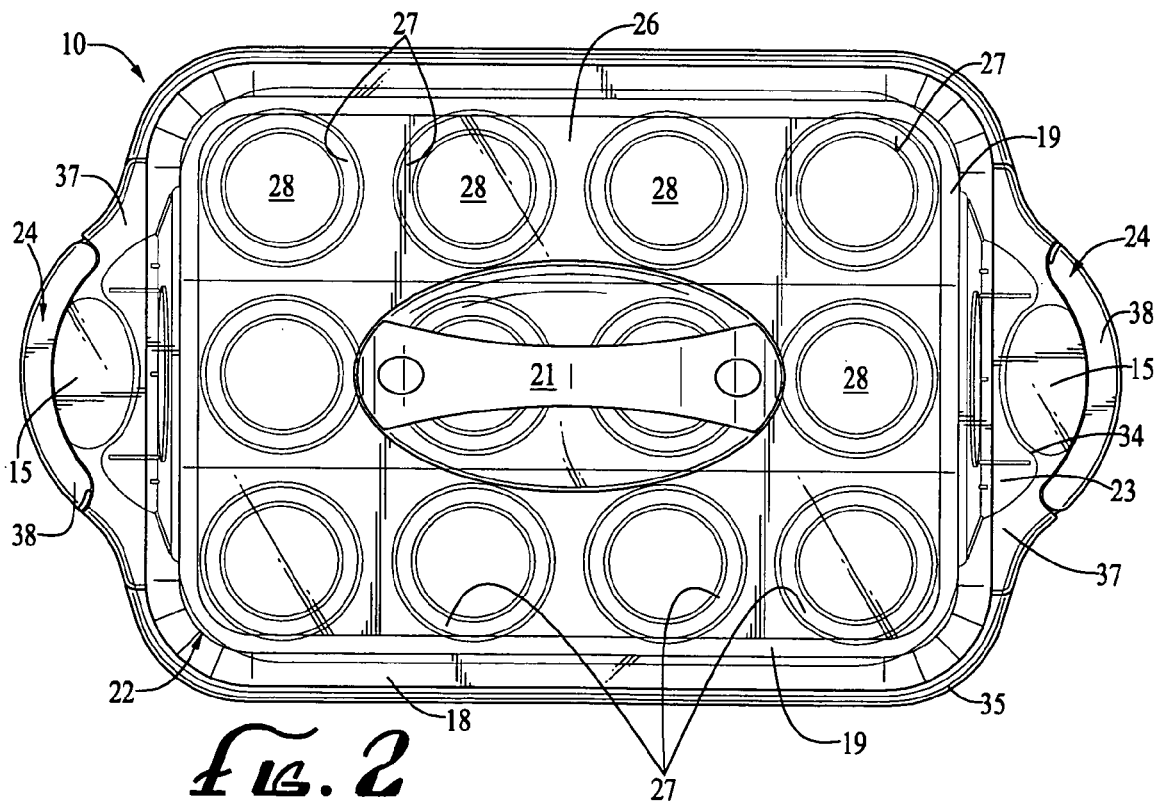
FIG. 2 is a top plan view of the holder of FIG. 1.

As shown in the drawings for purposes of illustration, the invention is embodied in a covered cupcake or muffin holder, indicated generally by the reference number 10, comprising a flat and generally rectangular baking sheet or pan 11 having a plurality of baking recesses 12, and a cover 13 positioned on top of the pan to protect baked goods (not shown) therein. The pan is a basically conventional metal baking sheet composed of heat-resistant metal and herein is generally rectangular in shape, with three rows of four cup-shaped recesses 12 in the sheet, two arcuate extensions forming handles 14 at each end with heat-resistant pads 15 in the handles, and a peripheral edge 17 around the rim 18 of the pan. The recesses preferably taper downwardly in a conventional manner. The cover 13 is transparent shatter-resistant material and shaped to engage the rim 18 of the baking pan 11 around its periphery and to overlie the baked goods in the recesses 12, being generally rectangular in cross-sectional shape. Muffins or cupcakes baked in the recesses will rise and form rounded tops in a well known manner, and the sidewalls and endwalls 19 of the cover are tall enough to allow clearance between the baked goods and the top wall 20 of the cover. A handle 21 is bolted to the cover in an oval depression centered on the top wall, permitting convenient handling of the cover.

Statement Of The Invention

In accordance with the preseal invention, at least one additional tier structure, indicated generally by the number 22, is provided in the holder 10 over the first tier provided by the pan 11, which forms a base for the multi-tiered holder 10, and is supported in an elevated position over the base pan on legs 23 engaging the base pan at its ends near the handles 14. Latches 24 on the cover interact with the handles 14 and with flanges 25 on the legs overlying the handles, both to hold the cover releasably in place on the base and to secure the second-tier structure in place in the holder 10, thereby permitting the holder to be carried in assembled and loaded condition. These latches are flush with the handles when latched, so as to be unobtrusive.

More specifically, the second-tier structure 22 comprises a second metal or plastic sheet 26, preferably of heat-resistant material, that is formed with a second selected number of cup-shaped recesses 27, similar to the recesses 12 in the base pan 11, the number of recesses in the representative second tier also being twelve. The upper recesses preferably are tapered in the same manner as the recesses 12, and have bottoms 28 that are spaced above the height of typical baked goods to be contained in the lower tier. These recesses may be approximately the same size as the lower recesses, herein being shown as slightly smaller and shallower, as a matter of choice.

Figure 6:
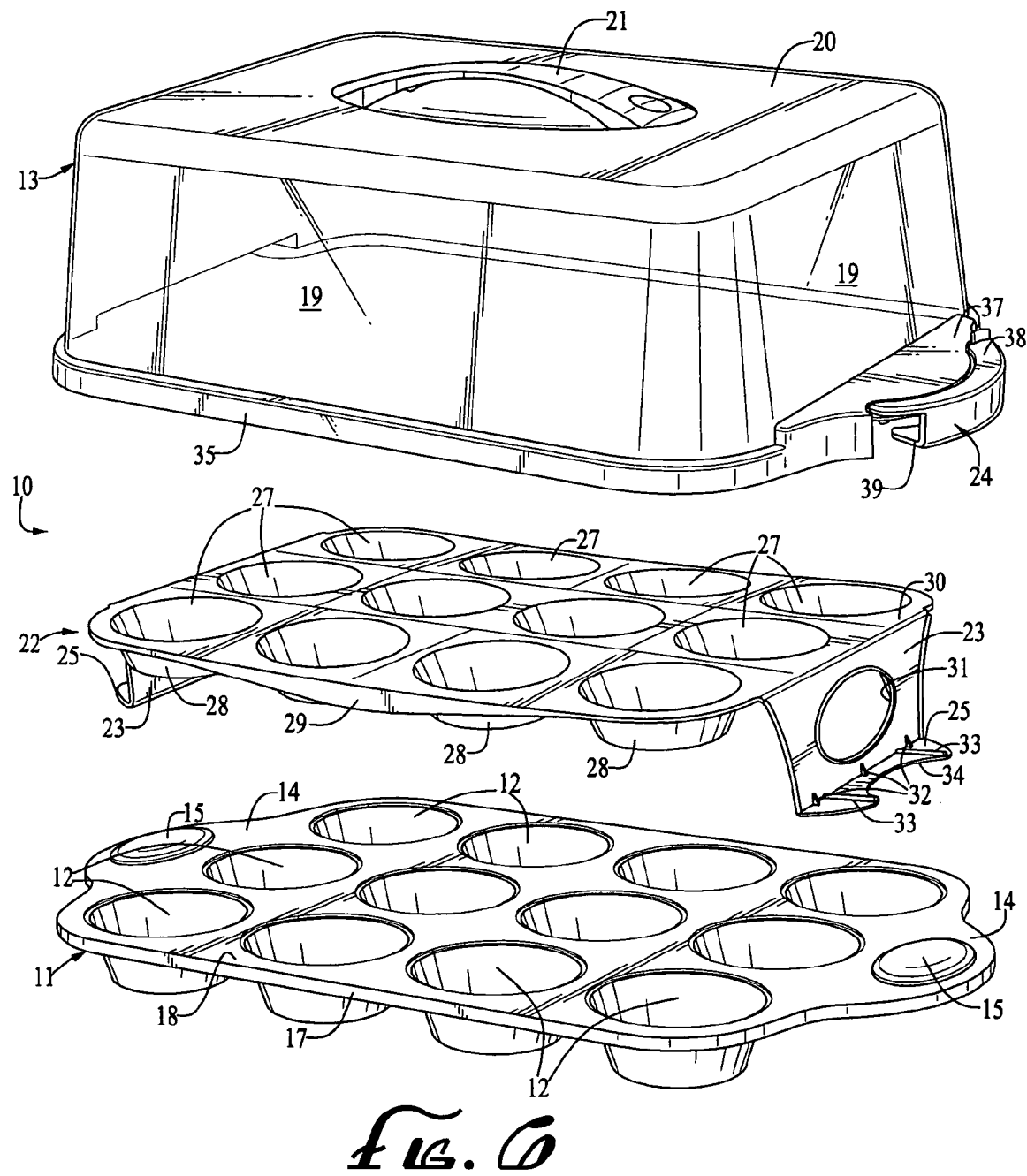
FIG. 6 is an exploded perspective view similar to FIG. 1, with the parts separated for clarity.

The second-tier recessed sheet 26 of the structure 22 is smaller than the base sheet 11 to permit the cover 13 to be tapered upwardly for a more pleasing appearance, and may have downturned flanges 29 on its side edges for structural stiffness, as well as the legs 23 on its opposite ends adjacent to the handles 14. These legs, of which there are two in the illustrative embodiment, are generally L-shaped depending straps or plates that are integrally joined to the sheet 26 by bends 30 at their upper ends, with the flanges 25 forming feet for the legs on their lower ends. The legs preferably are somewhat narrower then the width of the sheet 26, but are centrally located and are wide enough to provide stable support for the second-tier structure on the base sheet, preferably having cut-out openings 31 for weight and bulk reduction and visibility. The flanges 25 have reinforcing braces 32 (FIG. 6) and ribs 33 on their upper sides, and each is shaped with an arcuate edge 34 forming a recess for fitting around the pad 15 on the adjacent handle 14, as can be seen most clearly in FIG. 6.

Around the lower peripheral edge of the cover 13 is a band 35 that includes integral handles 37 at its ends for overlying the handles 14 of the base pan 11, and also overlying the flanges 25 of the legs 23 of the second-tier structure 22 to secure the second tier in place. These end handles 37 have the same basic shape as the handles 14 and fit over the latter as shown in FIG. 1 in aligned and flush relation. In effect, the two arcuate handles 14 and 37 fit together to form one handle at each end of the holder 10.

Figure 3:
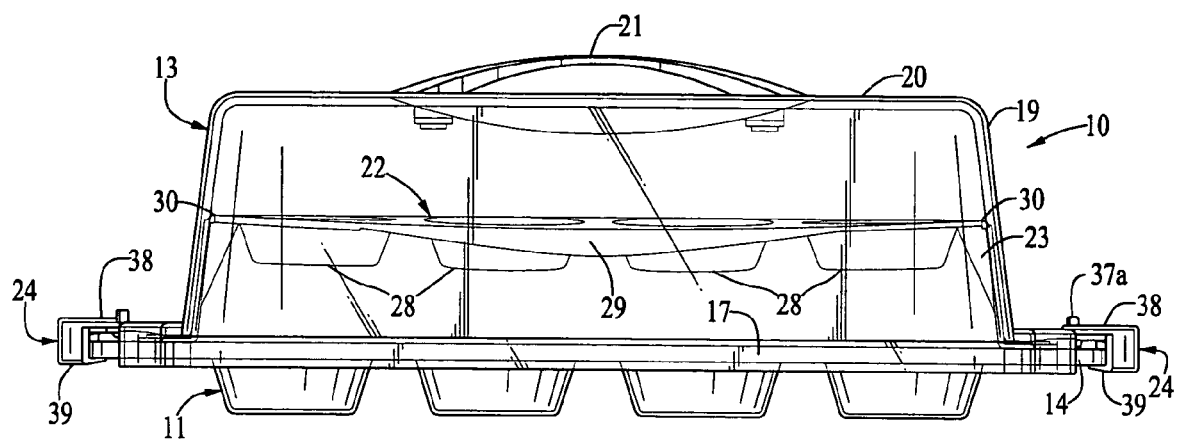
FIG. 3 is a side elevational view of the holder, on a somewhat reduced scale.
Figure 4:
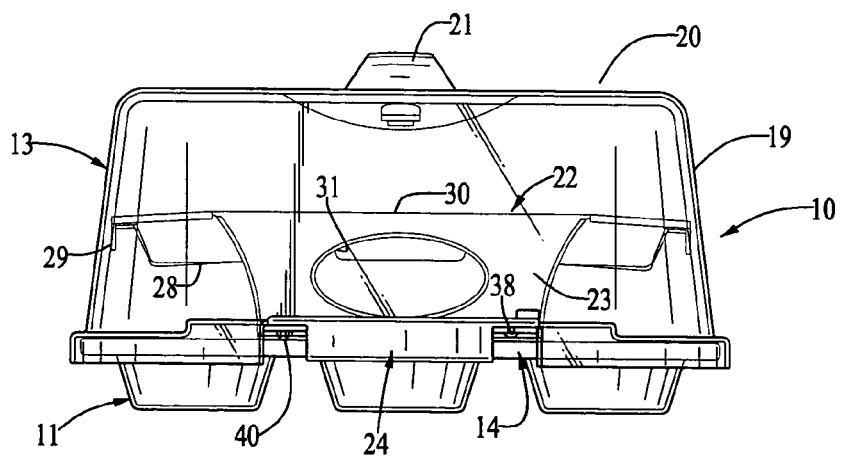
FIG. 4 is an end elevational view of the holder of FIG. 3.
Figure 5:
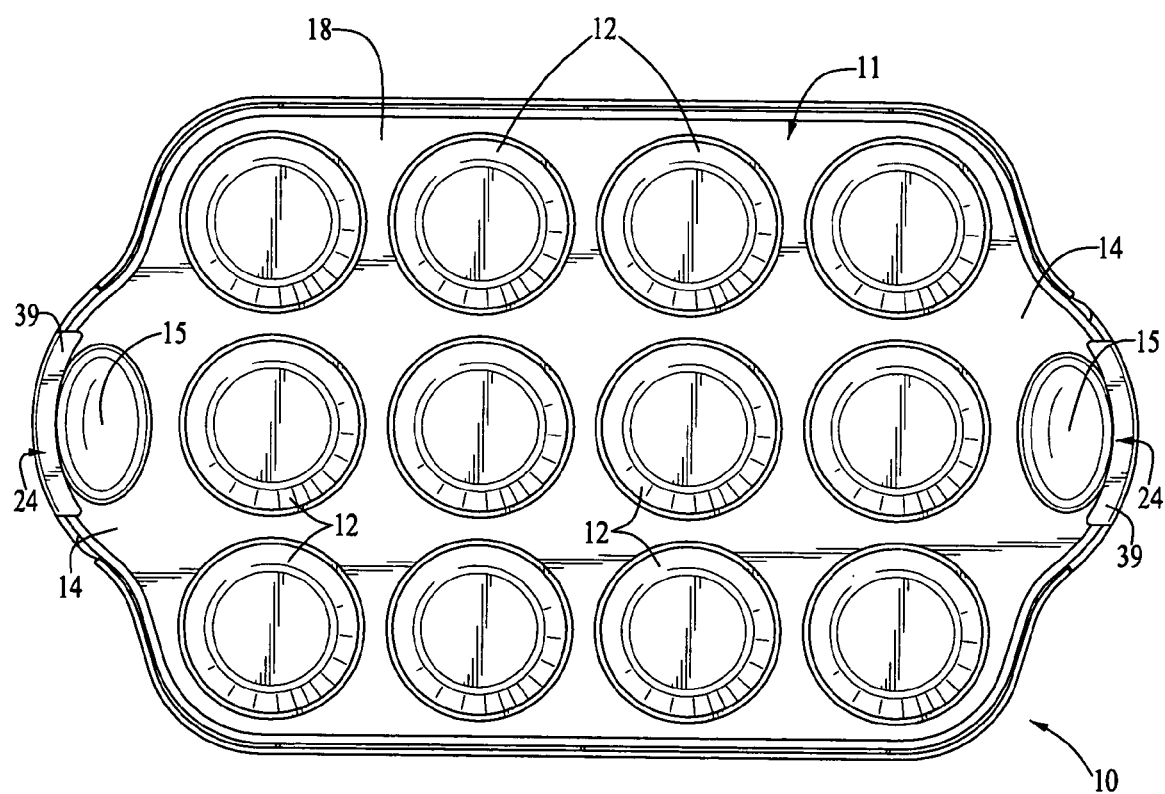
FIG. 5 is a bottom plan view of the holder.
Figure 7:
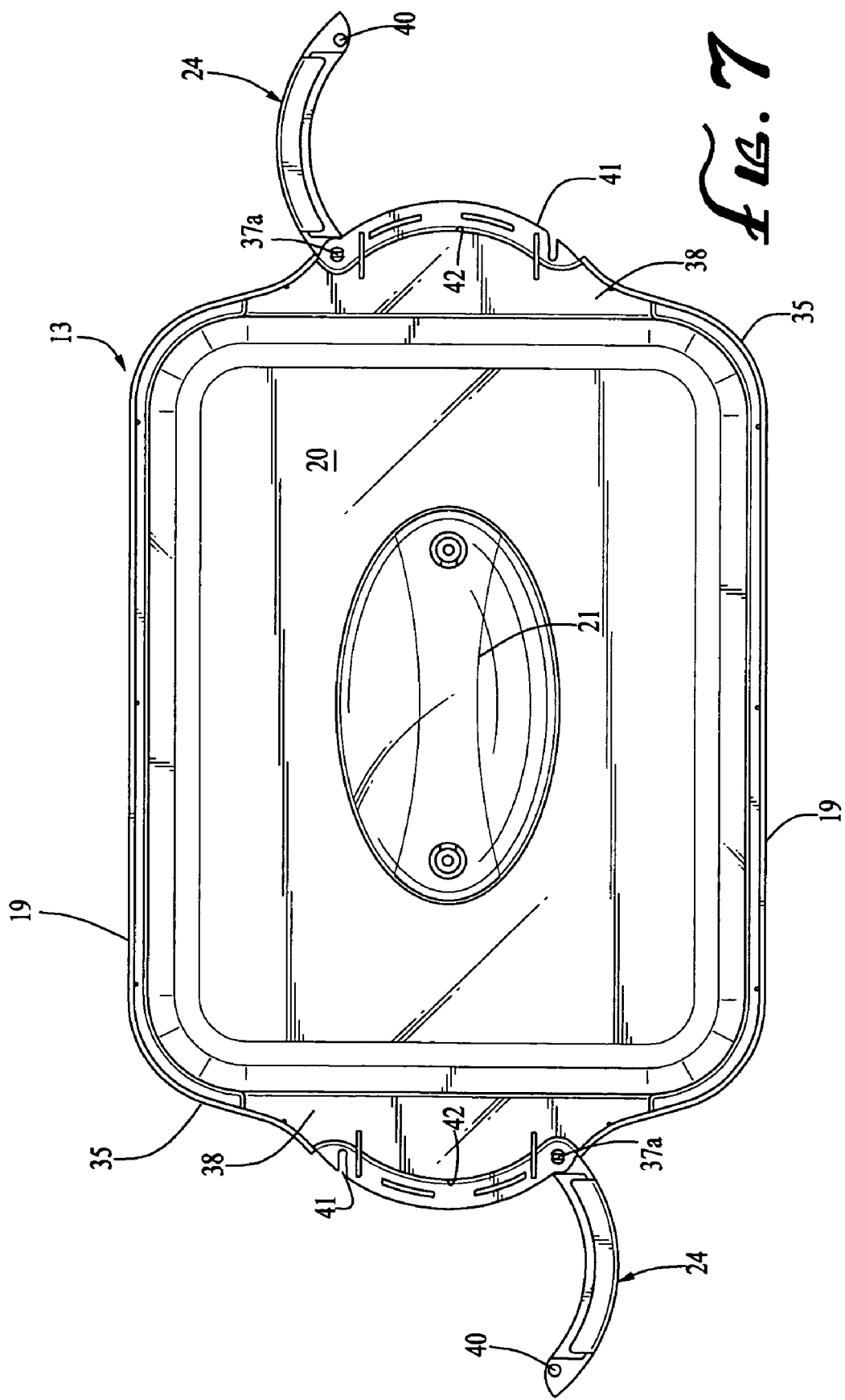
FIG. 7 is a bottom plan view of the cover alone with the latches in open position.

The latches 24 are pivotally connected to the end handles 37 by pins 37a, as shown in FIG. 7. It can be seen in FIGS. 3, 6 and 7 that the latches are arcuately curved channel-shaped members with upper sides 38 that overlie portions of the end handles, when latched, and bottom walls 39 that latch under the handles 14 of the base pan 11. The upper side 38 of each latch fits into a recess in the handle 37 to lie flush with the handle, and the pivot pins 38 extend between the top and bottom walls of the latches, through holes in the end handles 37. The free end of each latch carries a detent pin 40 (FIGS. 4 and 7) for engagement in a detent notch 41 in the end handle, to hold the latch releasably on the latched position. A shoulder 42 on the end handle acts as a stop for the latch.

With the foregoing arrangement, the multiple-tiered holder 10 of the present invention provides convenient holding and carrying capacity for a much larger number of baked goods, two dozen in the illustrative embodiment, as well as freshness protection and secure and easy carrying of the loaded holder. At the same time, the second-tier structure 22 fits compactly within the holder, and under the cover 13, permitting viewing of the baked goods within the holder. The latches 24 and the interacting flanges 25 and handles 14 ensure that the second-tier structure will be held securely in place during carrying of the holder and the contained baked goods.

It will be evident that, while one embodiment has been illustrated and described in detail, various modifications and changes may be made by those skilled in the art within the scope of the invention.

What is claimed:

1. A holder for baked goods, comprising:
a first generally flat and rectangular baking pan comprising a first sheet formed with a plurality of cup-shaped recesses and having extensions at opposite ends forming first handles;
a second generally flat and rectangular pan comprising a second sheet formed with a plurality of recesses and disposed in spaced relation overlying said first pan, said second sheet having legs extending toward and engaging the first sheet adjacent said handles to hold the second pan in spaced relation with the first pan, each of said legs having a flange extending outwardly from a bottom of each of said legs;
a cover of generally rectangular cross-sectional shape overlying and covering said pans and having a peripheral edge for engaging the peripheral portion of said first pan around the recess therein and second handles overlying said first handles with said flange of each of said legs of the second sheet sandwiched therebetween; and
a plurality of latches clamp and sandwich the first handles, second handles and said flange of each of said legs of the second sheet for securing said second pan and said cover releasably in place on said first pan, said plurality of latches being pivotably mounted on one of said first and second handles.

2. A holder as defined in claim 1 wherein said legs of said second sheet have feet thereon engaging the first sheet and overlying the first handles, said feet being secured between said first and second handles by said latches.

3. A holder as defined in claim 2 wherein said latches are channel-shaped members having top walls for overlying said second handles and bottom walls extending under the first handles.

4. A holder as defined in claim 3 wherein said handles and said latches are arcuately shaped, and said top walls of said members are recessed into said second handles.

5. A holder as defined in claim 1 wherein said second sheet is smaller than said first sheet and said cover comprises upright sidewalls and endwalls and a flat top wall and tapers from said peripheral edge toward said top wall.

6. A holder as defined in claim 5 further including a third handle mounted on said top wall.

7. A holder as defined in claim 1 wherein said cover is composed of shatter-resistant transparent material.

8. A holder as defined in claim 1 wherein said legs are flat plates that are integrally joined to said second sheet at opposite ends thereof, and said plates have flanges on the ends thereof for engaging the first sheet adjacent said first handles, said flanges overlying said first handles to be secured between the first and second handles by said latches.

9. A holder as defined in claim 8 wherein said second sheet has one leg at each end, narrower than said second sheet.

10. A holder for baked goods, comprising:
a first baking pan for holding a plurality of baked goods;
a second pan for holding a second plurality of baked goods, said second pan being disposed in spaced relation with said first pan and having legs engaging the first pan to hold the second pan in spaced relation with the second pan;
a cover overlying and covering said pans and having a peripheral edge engaging said first pan, to protect baked goods on the pans;
handles on opposite ends of the holder extending outwardly from the first pan; and
latches pivotably mounted on one of said handles and the peripheral edge of the cover for holding the cover releasably on the first pan and over the second pan,
wherein said legs of said second pan have flanges extending between the handles and the peripheral edge of said cover, and said latches clamp and sandwich the peripheral edge of said cover, flanges of said legs of said second pan, and the handles together.

11. A holder as defined in claim 10 wherein said handles comprise a first handle on each end of said first pan, and a second handle on each end of said cover overlying the first handle on the first pan and forming, in effect, one handle at each end of the holder.

12. A holder as defined in claim 11 wherein said legs have feet thereon disposed between said first and second handles, thereby to secure the second pan in place in the holder.

13. A holder as defined in claim 11 wherein said latches comprise members mounted on the holder for movement between latching and unlatching positions and operable to secure said first and second handles together in the latching positions.

14. A holder as defined in claim 13 wherein said latches are channel-shaped members and are pivotally mounted on one of said first and second handles, said members having top walls for overlying said second handles and bottom walls underlying said first handles, thereby to clamp the first and second handles together.

15. A holder as defined in claim 14 wherein said second handles have recesses for receiving said top walls in flush relation.

16. A holder as defined in claim 14 wherein said first and second handles and said members are arcuate in shape.

17. A holder as defined in claim 12 wherein said second pan has one leg at each end in the form of a depending plate joined to the end of the second pan above said handles, said plates being narrower than the second plate and said feet comprising flanges engaging the first plate and extending between said first and second handles.

18. A holder as defined in claim 10 wherein said cover has walls that taper away from said first pan to a top wall overlying said second pan, said cover being composed of transparent shatter-resistant material having a third handle secured thereto for toting the holder.

* * * * *